W. BERRY.
STUMP-EXTRACTORS.

No. 195,438.     Patented Sept. 25, 1877.

Attest.
Wm. D. Conklin
Geo. Perkins

Inventor.
William Berry

UNITED STATES PATENT OFFICE.

WILLIAM BERRY, OF TAYCHEEDAH, ASSIGNOR OF ONE-HALF HIS RIGHT TO JOHN S. McDONALD, OF FOND DU LAC, WISCONSIN.

IMPROVEMENT IN STUMP-EXTRACTORS.

Specification forming part of Letters Patent No. 195,438, dated September 25, 1877; application filed June 25, 1877.

*To all whom it may concern:*

Be it known that I, WILLIAM BERRY, of Taycheedah, in the county of Fond du Lac and State of Wisconsin, have invented a new and useful Improvement in Grub-Pulling Machines, which improvement is fully set forth in the following specification, reference being had to the accompanying drawings.

Figure 2:
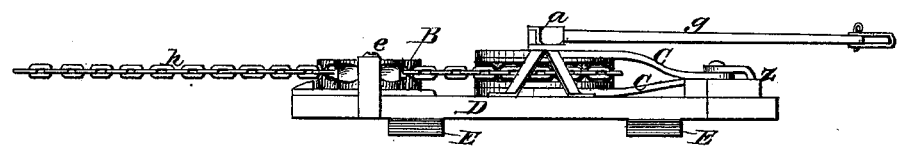
Figure 3:
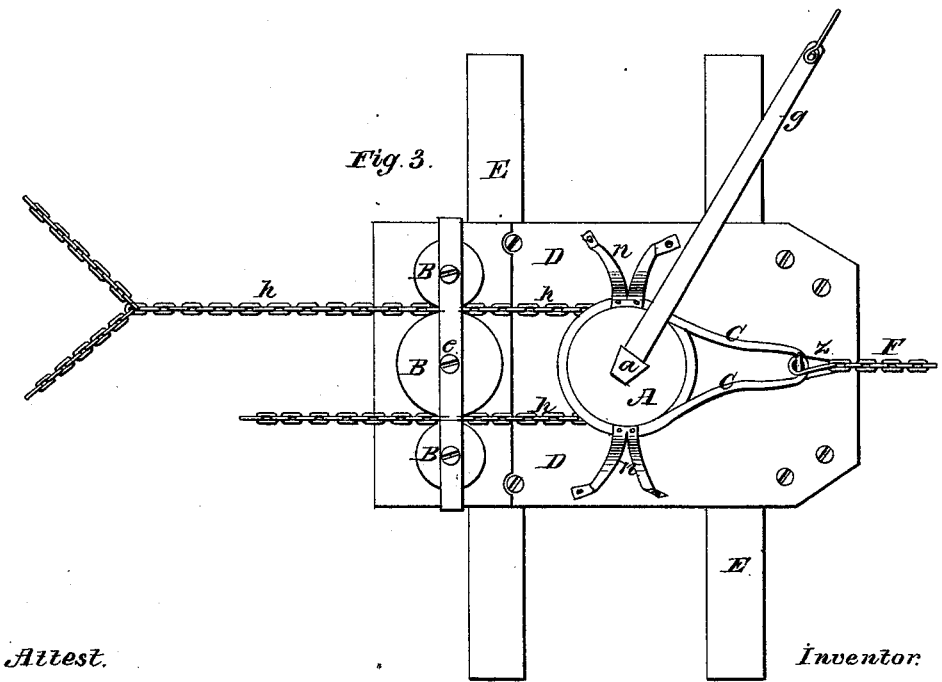

The object of my invention is to pull "grubs" from land rapidly and economically by means of a main wheel, A, draft-cable $h$, and tension and adjusting wheels B B B on a movable bed, and runners D E, anchored by chain F, so that, when once set and power applied, the machine will adjust itself, swing around, and extract all grubs within the circle, of which the draft-cable $h$ and anchor-chain F will form the radius, as shown in the plane and vertical views, Figures 2 and 3 of the accompanying drawings.

Figure 1:
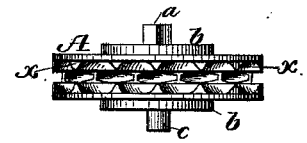

To explain and illustrate more in detail: As shown by Fig. 1, the main wheel A combines in one iron casting, first, a chain-drum, $x$, grooved and cut to match (as cogs) the draft-cable $h$; second, axles $b\ b$ running in hub-bands C C, Figs. 2 and 3; third, socket-post $a$ to receive sweep $g$, Figs. 2 and 3; fourth, journal $c$, running in its bearings in bed D.

As shown in Figs. 2 and 3, the main wheel A is placed, with other parts of machine, on a plank bed D, and turns in hub-bands C C bolted to block $z$, and is held to place by journal $c$ running in box and bearing in D. It is turned by horse-power on sweep $g$, and turns either way.

The hub-bands C C are held in place by braces $n\ n$, and perform the functions of hubs or bearings of axles $b\ b$.

The functions of the wheel system B B B with reference to the machine are twofold: First, the revolution of middle wheel, driven by draft-cable $h$, with its adjunctive outside wheels, keeps taut, and pays out the slack end of draft-cable; secondly, being strongly affixed by iron frame $e$ and heavy axle-bolts, they act as draft-pins to swing the machine either way, and keep it adjusted parallel with the draft as the cable straightens from side lines.

The bed D rests on cross-runners E E, which slide easily over the ground, and at the same time act as lateral braces for machine.

The draft-cable $h$ is supplied with complemental chains, to hitch onto several grubs at same time; and, after working and clearing the ground up to the machine, the slack end is, in its turn, made the draft-cable, by simply turning the horse about and reversing the motion of the main wheel A, thus pulling up all grubs in the circular space radiating from the anchorage without interruption by change of machine, power, or parts, excepting as it moves and adjusts itself to its work while at its work.

I claim as my invention—

1. The combination, in the main wheel A, in one piece, of the grooved and cut chain-drum $x$, axles $b\ b$, socket-post $a$, and journal $c$, substantially as and for the purposes hereinbefore set forth.

2. The combination of the main wheel A, hub-bands C C, tension and adjusting wheels B B B, bed D on cross-runners E E, reversible cable-draft $h$, and swinging anchorage F, substantially as and for the purposes hereinbefore set forth.

WILLIAM BERRY.

Witnesses:
 WM. D. CONKLIN,
 GEO. PERKINS.